(12) United States Patent
Keeney et al.

(10) Patent No.: US 9,348,618 B2
(45) Date of Patent: May 24, 2016

(54) SYSTEMS AND METHODS FOR ENHANCING FIRMWARE

(75) Inventors: Robert Patrick Keeney, Barrington, NH (US); Bruce Robert Ladeau, Hampton, NH (US); Rajeswara Rao Pasupuleti, Hyderabad (IN)

(73) Assignee: Aclara Meters LLC, Hazelwood, MO (US)

(*) Notice: Subject to any disclaimer, the term of this patent is extended or adjusted under 35 U.S.C. 154(b) by 1070 days.

(21) Appl. No.: 13/419,865

(22) Filed: Mar. 14, 2012

(65) Prior Publication Data

US 2013/0247073 A1    Sep. 19, 2013

(51) Int. Cl.
G06F 3/00    (2006.01)
G06F 9/44    (2006.01)
G06F 9/46    (2006.01)
G06F 13/00   (2006.01)
G06F 9/455   (2006.01)

(52) U.S. Cl.
CPC ...... *G06F 9/455* (2013.01); *G06F 2009/45579* (2013.01)

(58) Field of Classification Search
CPC .................................................. G06F 9/455
USPC .................................................. 719/321
See application file for complete search history.

(56) References Cited

U.S. PATENT DOCUMENTS

| | | | |
|---|---|---|---|
| 6,486,652 B1 | 11/2002 | Ouellette et al. | |
| 6,564,159 B1 | 5/2003 | Lavoie et al. | |
| 7,065,457 B1 | 6/2006 | Germer et al. | |
| 7,853,960 B1 | 12/2010 | Agesen et al. | |
| 2004/0230963 A1 | 11/2004 | Rothman et al. | |
| 2005/0160191 A1* | 7/2005 | Maciesowicz | G06F 3/14 710/1 |
| 2006/0101410 A1* | 5/2006 | Massarenti et al. | 717/126 |
| 2006/0116208 A1 | 6/2006 | Chen et al. | |
| 2006/0238302 A1 | 10/2006 | Loving et al. | |
| 2007/0067499 A1 | 3/2007 | Wolfe et al. | |
| 2007/0239944 A1 | 10/2007 | Rupanagunta et al. | |
| 2008/0148048 A1 | 6/2008 | Govil et al. | |
| 2008/0204953 A1* | 8/2008 | Shuey | 361/60 |
| 2010/0180265 A1 | 7/2010 | Tsai et al. | |

OTHER PUBLICATIONS

J.E. Smith, et al., "Virtual Machines: Architectures, Implementations and Applications," HOTCHIPS 17, Tutorial 1, Part 1, Aug. 14, 2005, 152 pages.

James E. Smith et al., "The Architecture of Virtual Machines," Computer, May 2005, 32-38, IEEE Computer Society.

(Continued)

*Primary Examiner* — Timothy A Mudrick

(74) *Attorney, Agent, or Firm* — Polster, Lieder, Woodruff & Lucchesi, LC

(57) ABSTRACT

A measuring instrument includes at least one processor having at least one processor internal resource. The measuring instrument may also include at least one hardware component external to the processor and at least one storage component. Firmware may be stored in the storage component and is accessible by the processor. The firmware includes at least one application; a virtualized hardware system having routines that emulate at least one processor internal resource; and at least one application programming interface between the application and the virtualized hardware system.

18 Claims, 4 Drawing Sheets

(56) References Cited

OTHER PUBLICATIONS

Edward A. Lee, "What's Ahead for Embedded Software?" Computer, Sep. 2000, 18-26, IEEE Computer Society.

"Understand Electronic-Meter Design to Better Craft Intelligent and Secure Systems," Driving Trust™ Inside Secure, www.insidesecure.com, © 2010, 1-9.

* cited by examiner

SYSTEMS AND METHODS FOR ENHANCING FIRMWARE

TECHNICAL FIELD

The subject matter disclosed herein relates to measuring instruments, and more particularly to an electricity meter with enhanced firmware portability.

BACKGROUND

In general, instruments include devices that measure physical quantities of objects and events. An example of a measuring instrument is an electricity meter. Electricity meters measure the amount of electric energy consumed by a residence, business, or an electrically powered device.

Electronic electricity meters include a microcontroller, or processor that controls a number of subsystems including metrology subsystems, communication subsystem(s) and data stores. The processor is typically programmed with firmware that controls the interaction of the processor with the different subsystems. The firmware includes programs (drivers) that allow the operating system and application software to interact with hardware components. Typically drivers are written to include higher level logic elements and hardware specific elements within the same code.

As new meters are developed over time they may have unique microprocessor or microcontroller hardware features. This may include specific components external to the processor. Because hardware drivers are typically hard coded into the firmware applications, the firmware has to be re-programmed (applications have to be rewritten) to incorporate new device drivers. Re-programming of the firmware is costly.

BRIEF DESCRIPTION OF THE INVENTION

In accordance with one exemplary non-limiting embodiment, the invention relates to a measuring instrument including at least one processor having at least one processor internal resource. The measuring instrument may also include at least one hardware component external to the processor and at least one storage component. Firmware may be stored in the storage component and is accessible by the processor. The firmware includes at least one application; a virtualized hardware system having routines that emulate at least one processor internal resource; and at least one application programming interface between the application and the virtualized hardware system.

In another embodiment, a method for controlling a measuring instrument having a processor, firmware, and at least one hardware component external to the processor is provided. The method includes storing at least one application in the firmware, and providing a virtualized hardware system having routines that emulate at least one processor internal resource. The method may also include providing at least one application programming interface between the application and the virtualized hardware system, and providing instructions that map the application programming interface to the processor internal resource. The method may also include communicating between the application and the processor internal resource through the application programming interface.

In another embodiment, a meter including a metrology subsystem; a communications subsystem; and a microcontroller is provided. The microcontroller is provided with an architecture having an application layer; a device driver layer; an interface driver layer; and a hardware layer.

In another embodiment, a method for communicating data in a meter between an application, a processor and a hardware device coupled to the processor is provided. The method includes the steps of sending data from the application to at least one abstracted device driver; and sending data from the abstracted device driver to an abstracted interface driver.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
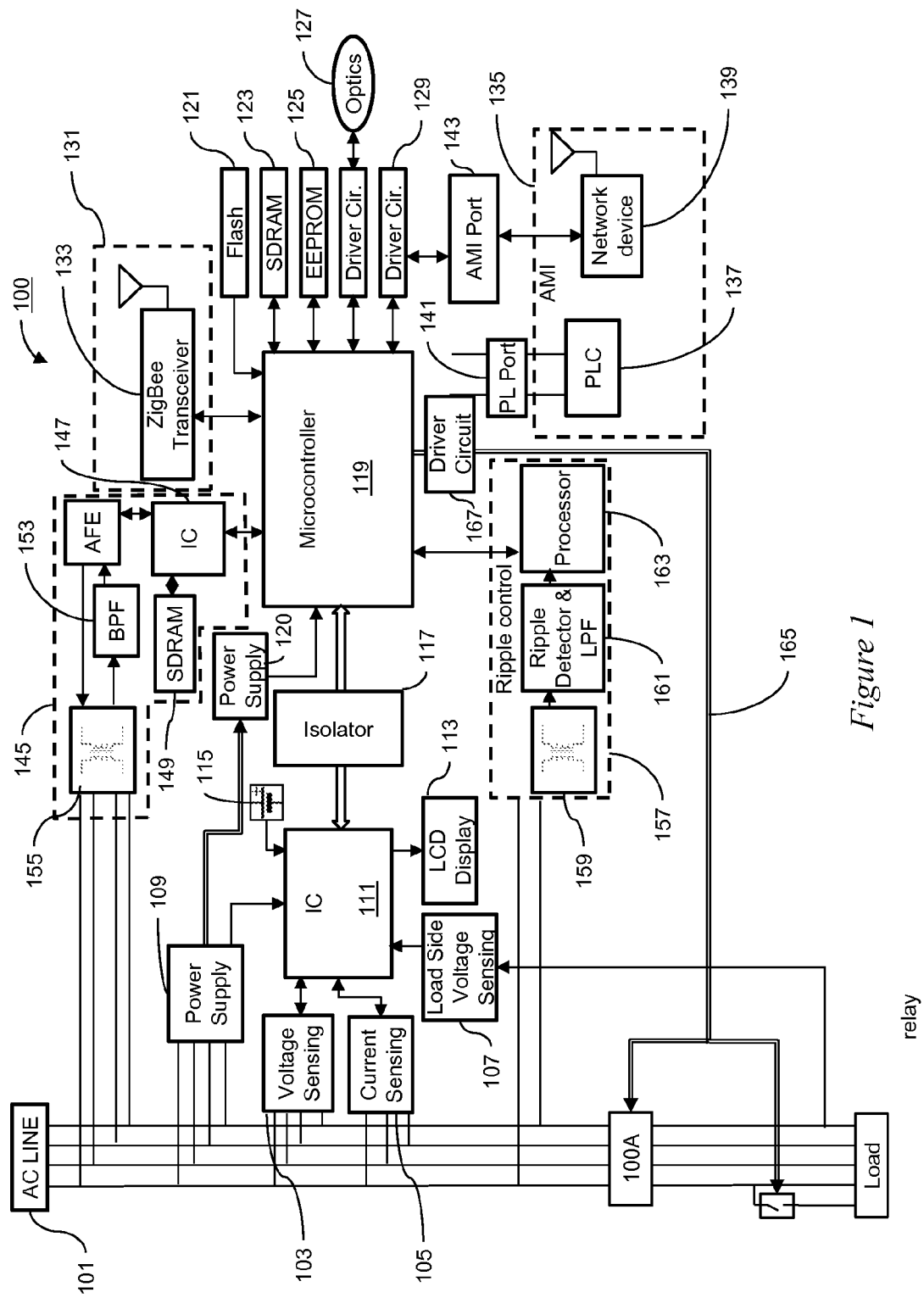
FIG. 1 shows an exemplary electronic meter

FIG. 1 illustrates a representative embodiment of a meter 100 to which the present invention may be applied. In this embodiment the meter 100 is an electricity meter. Meter 100 may be connected to either a single phase or a three phase alternating current (AC) power source 101. Meter 100 may include a voltage sensing component 103 and a current sensing component 105. The voltage sensing component 103 provides a signal representative of a line voltage and current sensing component 105 provides a signal representative of the line current. In some embodiments the meter 100 may also include a load side voltage sensing component 107 representative of the line voltage at the load side. Meter 100 may also include a power supply 109 coupled to the power source 101. The power supply 109 provides power to all circuits, including a metrology integrated circuit (Metrology IC) 111 such as a Teridian 71M6541/6542. The Metrology IC 111 may be an integrated system-on-chip (SoC) with a microprocessor core, a real-time clock (RTC), flash memory, and liquid crystal display (LCD) driver (not shown). The metrology IC 111 may be coupled to an LCD display 113. The metrology IC 111 may also receive power from a battery 115. The battery (or supercap) provides power so that the RTC can continue to function during power outages. The meter 100 may be provided with an isolator 117 that acts as a filter between two or more subcircuits to block noise. Ideally, signals (data) pass through the isolator 117 with no distortion and blocks any noise.

The meter 100 may also include a microcontroller 119. The microcontroller 119 may be a small computer or a single integrated circuit containing a processor core, memory, and programmable input/output peripherals. In some embodiments a microprocessor may be substituted for the microcontroller 119. The microcontroller 119 may access one or more storage devices such as a flash memory 121, a dynamic random access memory (SDRAM) 123, and an Electrically Erasable Programmable Read-Only Memory (EEPROM) 125. The microcontroller 119 may also access one or more input/output or communications components, such as, for example an optical interface 127. Associated with the optical interface 127 is an optic driver 129. Optical interfaces to electricity meters are usually designed to IEC1107 or ANSI C12.18 standards. These standards specify data rates, character format, transmission protocol as well as the optical and mechanical parameters of the optical interface. Another communication component that may be coupled to the microcontroller 119 is a wireless communication component 131, such as those that implement the ZigBee standard, Wi-Fi, HomePlug Green PHY and the like. In one embodiment a ZigBee transceiver 133 may be provided. The wireless communication component 131 may communicate with a home area network (HAN) that connect to digital devices of a user. Wireless communication components may include a system on a chip that implements the appropriate standard. Yet another communication component that may be coupled to the microcontroller 119 may be an Advanced Metering Infrastructure (AMI) system 135. AMI Systems may incorporate a Power Line Communication (PLC) subsystem 137 for carrying data through the power line. The AMI system 135 may also be implemented with network devices 139 that connect to a network such as a mesh network, a WiMax network or a GSM network. The PLC subsystem 137 may be coupled to the meter 100 through a PL port 141. The AMI system may be coupled to the meter 100 through an AMI port 143. Other communication components such as hardwired components (e.g. RS485 or Ethernet links) may be used to communicate externally.

Another way that PLC communications may be implemented is through a powerline communication subsystem 145 that may have a PLC integrated circuit 147 coupled to a synchronous SDRAM 149. SDRAM 149 has a synchronous interface that waits for a clock signal before responding to control inputs. An analog to digital converter such as, for example, an analog front end (AFE) 151 may be coupled to the PLC integrated circuit 147. A band pass filter (BPF) 153 and a transformer 155 may also be included in the power line communication subsystem 145. The meter 100 may also be provided with a ripple control subsystem 157. A ripple is a small unwanted residual periodic variation of direct current output of the power supply which is been derived from an alternating current source such as power source 101. The ripple control subsystem 157 may include a transformer 159, a ripple detector and low pass filter (LPF) 161 that filters out frequencies higher than a cutoff frequency, and a processor 163. The meter 100 may be provided with an isolation circuit 165 that may be used to isolate the meter 100 from the load. The isolation circuit may include a relay driver 167 and a relay 169

Figure 2:
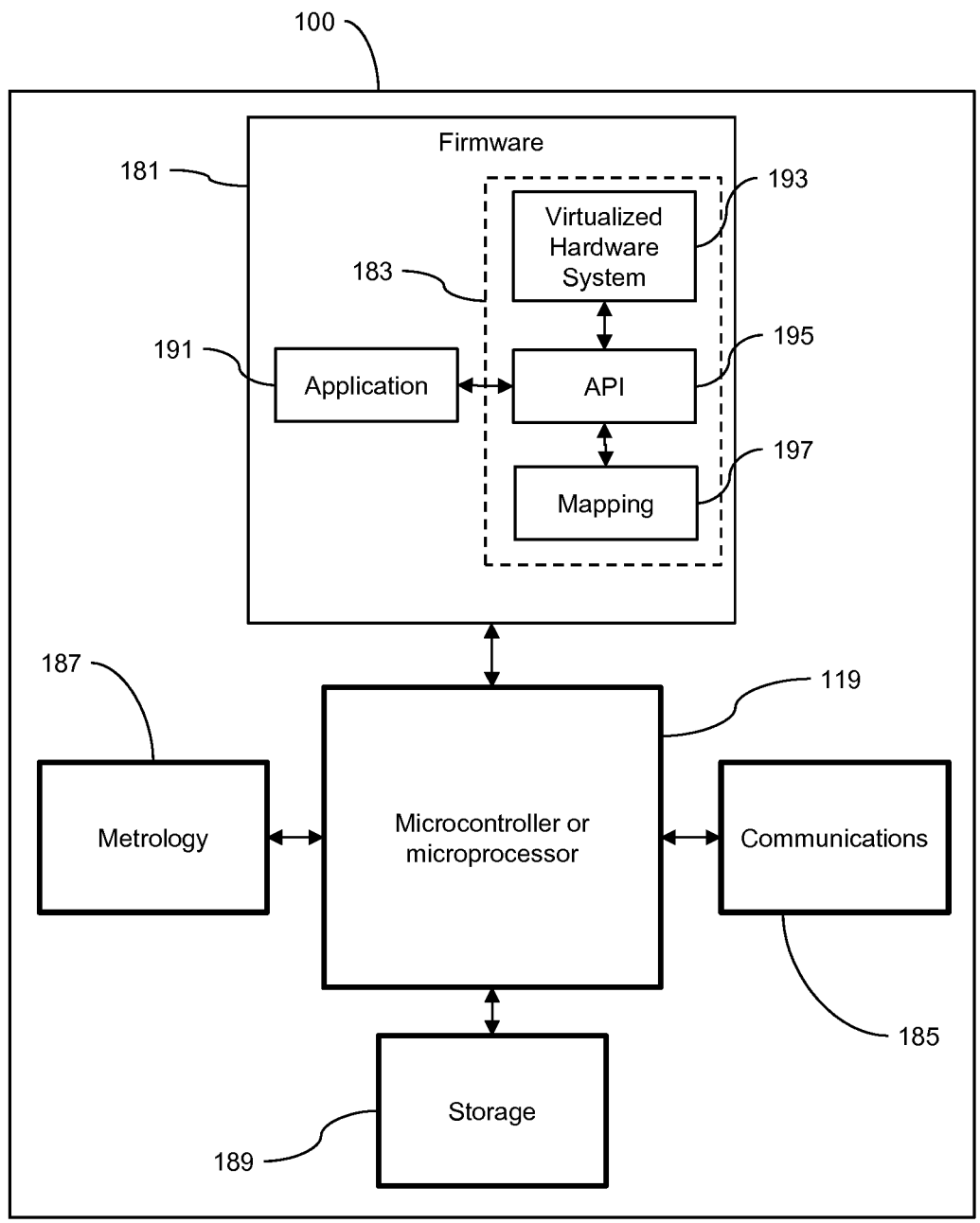
FIG. 2 is a block diagram of an electricity meter with a hardware abstraction system.

Illustrated in FIG. 2 is a high level functional representation of a meter 100 including the firmware 181 with hardware abstraction system 183. Firmware is a term often used to denote fixed programs and/or data structures that internally control various processor resources and hardware components. A resource, or system resource, is any physical or virtual component of limited availability within a computer system. Every device connected to a computer system is a resource. Every internal system component is a resource. Virtual system resources include files, network connections and memory areas. Hardware abstractions such as those implemented by the hardware abstraction system 183 are software routines that emulate some platform-specific details, giving programs direct access to the hardware resources. A hardware abstraction layer (HAL) is an abstraction between the physical hardware of a microcontroller 119 and the software that runs on the microcontroller 119. The function and technical effect of a HAL is to hide differences in hardware from most of the application and operating system firmware on the microcontroller, so that most of the firmware does not need to be changed to run on systems with different hardware. A HAL is implemented with software.

The meter 100 includes a microcontroller 119 coupled to a communication subsystem 185, the metrology subsystem 187 and a storage subsystem 189. The microcontroller 119 accesses hardware abstraction system 183 and one or more applications 191 in the firmware 181. The hardware abstraction system 183 includes a virtualized hardware system component 193, an application programming interface (API) 195 and a software component, such as mapping software component 197. The virtualized hardware system component 193 includes one or more software routines that emulate at least one processor resource or hardware component interface. The API 195 is an interface used by software components to communicate with each other. The API 195 enables communication between the applications 191 and the virtualized hardware system component 193.

Figure 3:
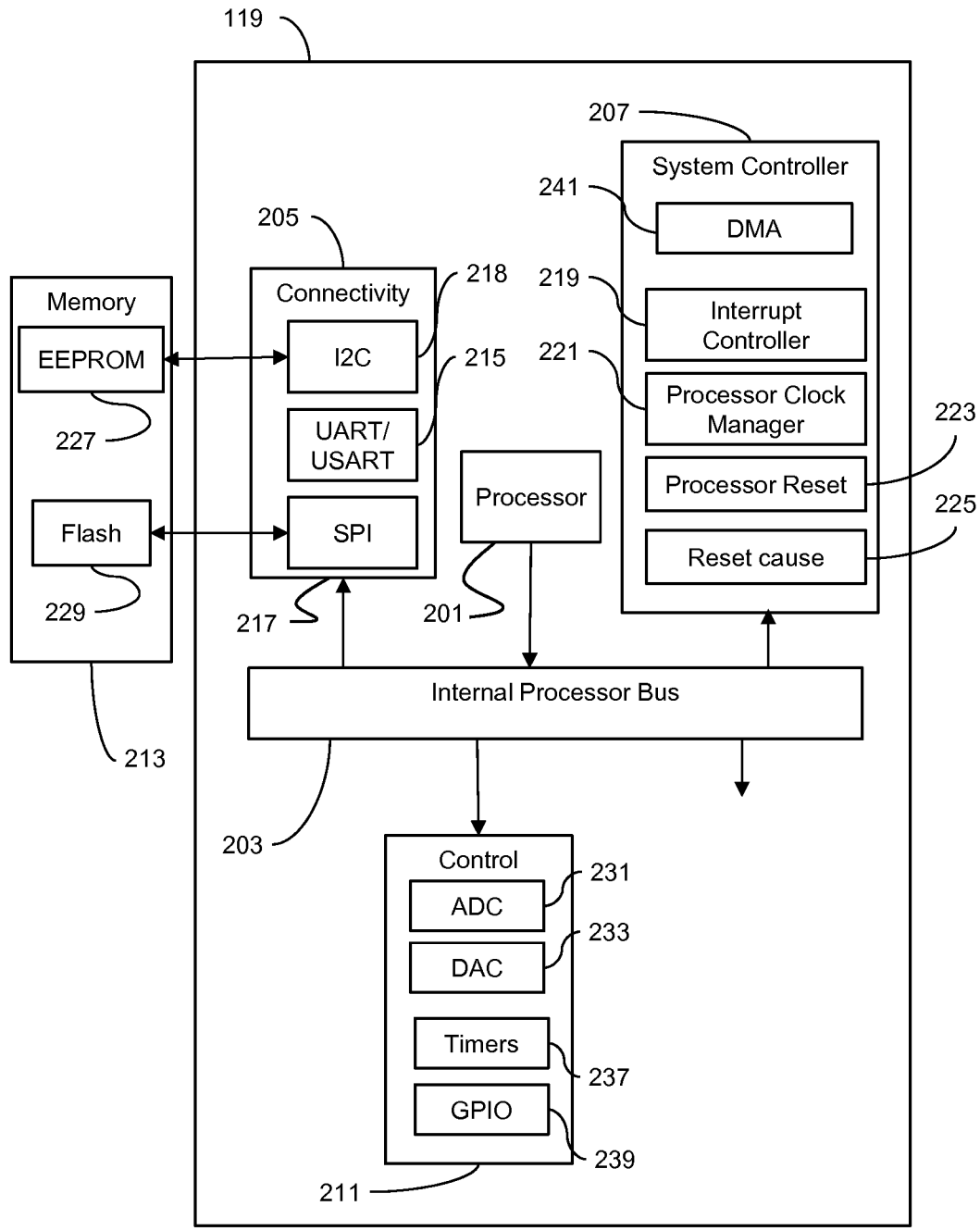
FIG. 3 shows an exemplary microcontroller with resources that may be abstracted in a hardware abstraction system.

FIG. 3 illustrates a microcontroller 119 and the processor resources or processor hardware component interfaces that may be abstracted in the virtual hardware system component 193. In one embodiment, the microcontroller 119 may include a processor 201. A suitable processor may be an ARM 9 processor such as an ARM926EJ-S processor with a 32-bit RISC CPU. The processor 201 may be connected to the various subsystems of the microcontroller 119 through an internal processor bus 203. The microcontroller 119 may also include a communications input/output subsystem 205, a system controller 207, a control subsystem 211 and a memory subsystem interface 213.

The connectivity subsystem 205 may include a UART/USART interface 215. A UART (Universal Asynchronous Receiver/Transmitter) is usually an individual integrated circuit or a component of an integrated circuit used for serial communications over a computer or peripheral device serial port. Many modern integrated circuits may include a USART (universal synchronous/asynchronous receiver transmitter) that can also communicate synchronously. The connectivity subsystem 205 may also include a Serial Peripheral Interface (SPI interface) 217. The SPI interface 217 is a synchronous serial interface for connecting external devices having low-/medium-bandwidth. SPI devices communicate using a master/slave relationship over two data lines and two control lines. The connectivity subsystem 205 may also include may include an I2C interface 218. An I2C is a multi-master serial single-ended bus used to attach low-speed peripherals to a motherboard or embedded system The system controller 207 may include an interrupt controller 219. An "interrupt" is an asynchronous signal indicating the need for attention or a synchronous event in software indicating the need for a change in execution. An interrupt controller 219 is used to combine several sources of "interrupt" on one or more CPU lines and/or processor internal resources (e.g. a DMA controller completion interrupt), while allowing priority levels to be assigned to its interrupt outputs. The system controller 207 may also include a processor clock manager 221 for manipulating clock signals. The system controller 207 may also include a processor reset resource 223. Processor reset resource 223 resets the processor, making it start execution from a reset vector address. The system controller 207 may also include a determine cause of processor reset resource 225 a resource that determines the cause of a reset which can then be used to condition the startup processing of the firmware based on the "cause." The system controller 207 may also include a direct memory access (DMA) interface 241. A DMA allows some hardware subsystems to access system memory independently of the processor 201.

The memory subsystem interface 213 may include an EEPROM 227, a non-volatile memory to store small amounts of data that must be saved when power is removed. The memory subsystem interface 213 may also include a flash memory interface 229. Flash memory is a non-volatile computer storage chip that can be electrically erased and reprogrammed.

The control subsystem 211 may include an analog to digital conversion (ADC) interface 231 and a digital to analog conversion (DCA) interface 233. An ADC converts a continuous quantity to a discrete time digital representation. A DAC does the inverse of the ADC converting a multi-level discrete time digital representation into a continuous signal. The control subsystem 211 may also include a PWM interface 235. Pulse-width modulation (PWM) is a technique for controlling power to inertial electrical devices. The control subsystem 211 may also include timer resources 237, and a General Purpose Input/Output (GPIO) interface 239. A GPIO is a generic pin on a chip whose function is controlled through software to input or output a discrete binary signal to the system.

Figure 4:
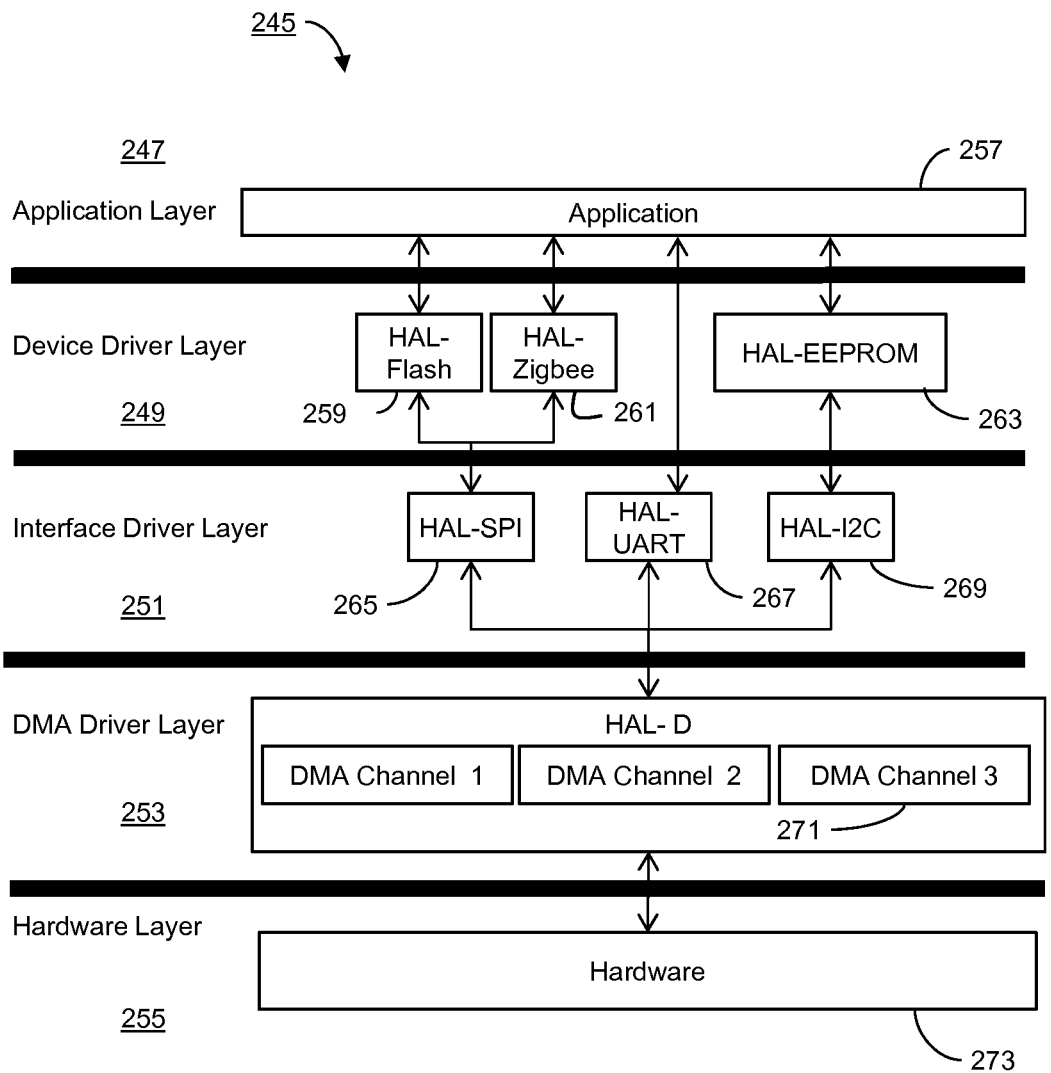
FIG. 4 is a block diagram of one embodiment of a hardware abstraction implemented in an electricity meter.

Illustrated in FIG. 4 is the hardware abstraction system architecture 245 of a virtualized hardware system. The virtualized hardware system may include one or more routines that emulate at least one function of an external hardware component. In one embodiment the hardware abstraction system architecture 245 includes an application layer 247, a device driver layer 249, an interface driver layer 251, a DMA driver layer 253, and a hardware layer 255. One or more applications 257 may reside in the application layer 247. The device driver layer 249 provides those services that are generic to the particular architecture of the devices accessed by the application (e.g. common hardware driver elements). For example, the device driver layer 249 may determine which type of transfer is appropriate (program I/O or DMA). Device driver layer 249 may include a one or more device driver abstractions such as for example, serial flash driver abstraction 259, a ZigBee driver abstraction 261, and an EEPROM driver abstraction 263. As used here, a device driver abstraction means a computer program allowing another computer program to interact with drivers that are generic to the relevant class of hardware devices common hardware driver elements). For example a device driver abstraction may provide services (to a device) that are necessary irrespective of the hardware specific driver elements.

The interface driver layer 251 arbitrates multiple devices on a single bus and performs data transfers using its own routines for program input and output. The interface driver layer 251 may utilize a HAL-DMA (HAL-D) function of the processor 201 to accomplish the movement of data between the interface driver layer and the hardware itself. The interface driver layer 251 also sets the baud rate. The interface driver layer 251 may include an SPI driver abstraction 265, a UART driver abstraction 267 and an I2C driver abstraction 269. The DMA driver layer 243 manages a fixed number of DMA channels for moving data from memory to peripherals, peripherals to memory, or memory to memory. The DMA driver layer does not allocate memory. DMA driver layer 253 may include one or more abstracted DMA drivers 271. The DMA driver layer 253 communicates with one or more hardware component 273 and the interface layer that may reside in the hardware layer 255.

In one embodiment the hardware abstraction system 183 provides a method for communication data between an application 257 and a hardware component 273. A calling program in the application invokes a routine in an abstracted driver in the device driver layer (for example serial flash driver abstraction 259, ZigBee driver abstraction 261, or EEPROM driver abstraction 263. The abstracted driver issues commands to an abstracted driver on the interface driver layer 251 (such as SPI driver abstraction 265, UART driver abstraction 267, or I2C driver abstraction 269). The abstracted driver on the interface driver layer then issues the command to an abstracted DMA driver 271 on DMA driver layer 253. Commands are then transmitted to the hardware component 273 via the DMA driver layer 253. Hardware component 273 sends data back via the abstracted DMA driver 271. The abstracted DMA driver communicates data to an abstracted driver in the interface driver layer 251 which in turns communicates data to an abstracted driver in the device driver layer 249. The abstracted driver in the device driver layer 249 may invoke routines in the original calling program of the application 257.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A measuring instrument comprising:
    at least one processor having at least one processor internal resource;
    at least one hardware component external to the processor;
    at least one storage component;
    firmware stored in the storage component and accessible by the processor, the firmware comprising:
    at least one application;
    a virtualized hardware system configured to determine one or more differences between the at least one application of the firmware and one or more of the at least one processor internal resource and the at least one hardware component external to the processor, the one or more differences including at least parameters associated with the at least one application,
    wherein the virtualized hardware system includes routines that emulate, based on the one or more determined differences, the at least one processor internal resource, and
    wherein the virtualized hardware system is configured to change, based on the one or more determined differences, at least one of the following: the at least one hardware component external to the processor and the at least one processor internal resource to provide the at least one application with an access to the at least one processor internal resource and the at least one hardware component external to the processor; and
    at least one application programming interface between the application and the virtualized hardware system.

2. The measuring instrument of claim 1 wherein the routines comprise drivers having at least one common processor driver element and at least one processor specific driver element.

3. The measuring instrument of claim 2 wherein the application programming interface comprises at least one of the common processor driver element.

4. The measuring instrument of claim 2 wherein the firmware further comprises at least one software component that maps the application programming interface to at the least one processor specific driver element.

5. The measuring instrument of claim 1 wherein the firmware further comprises at least one software component that maps the application programming interface to the at least one processor internal resource.

6. The measuring instrument of claim 1 wherein the at least one hardware component external to the processor comprises at least one driver having at least one common hardware driver element and having at least one hardware specific driver element.

7. The measuring instrument of claim 6 wherein the application programming interface comprises at least one common hardware driver element.

8. The measuring instrument of claim 6 wherein the firmware further comprises at least one software component that maps the application programming interface to the at least one hardware specific driver element.

9. The measuring instrument of claim 1 wherein the at least one processor internal resource comprises at least one processor internal resource selected from among the group consisting of an I2C interface, a GPIO interface, an ADC, a DAC interface, an interrupt controller interface, a processor clock management interface, an SPI interface, a hardware timer, a UART/USART interface, a processor watchdog handler; and a processor security engine.

10. The measuring instrument of claim 1 wherein the at least one hardware component comprises at least one selected from among the group consisting of a metrology subsystem, a communications subsystem, and a data store.

11. The measuring instrument of claim 10 wherein the data store comprises at least one selected from among the group consisting of an EEPROM and a flash memory.

12. The measuring instrument of claim 10 wherein the metrology subsystem comprises at least one selected from among the group consisting of a voltage sensor, a current sensor, and a load side voltage sensor.

13. The measuring instrument of claim 10 wherein the communication subsystem comprises at least one selected from among the group consisting of a wireless communication subsystem; a power line communications subsystem; and an optical communication subsystem.

14. A method for controlling a measuring instrument having a processor, firmware, and at least one hardware component comprising:
    storing at least one application in the firmware;
    providing a virtualized hardware system configured to determine one or more differences between the at least one application of the firmware and one or more of the at least one processor internal resource and the at least one hardware component external to the processor, the one or more differences including at least parameters associated with the at least one application,
    wherein the virtualized hardware system includes routines that emulate,
    based on the one or more determined differences, the at least one processor internal resource, and
    wherein the virtualized hardware system is configured to change, based on the one or more determined differences, at least one of the following: the at least one hardware component external to the processor and the at least one processor internal resource to provide the at least one application with an access to the at least one processor internal resource and the at least one hardware component external to the processor;
    providing at least one application programming interface between the application and the virtualized hardware system;
    providing instructions that map the application programming interface to the processor internal resource; and
    communicating between the application and the processor internal resource through the application programming interface.

15. The method of claim 14 further comprising providing a virtualized hardware system having at least one routine that emulate at least one function of the external hardware component.

16. The method of claim 15 wherein the function of the external hardware component comprises at least one common hardware driver element and at least one hardware specific driver element.

17. The method of claim 16 wherein the method element of providing at least one application programming interface between the application and the virtualized hardware system comprises providing at least one application programming interface with the at least one common hardware driver element.

18. The method of claim 15 wherein the method element of providing a virtualized hardware system comprises providing at least one subsystem selected from among the group consisting of a virtualized metrology subsystem, a virtualized communications subsystem, and a virtualized data store.

* * * * *